(12) United States Patent
Marti

(10) Patent No.: US 9,619,670 B1
(45) Date of Patent: Apr. 11, 2017

(54) DETECTING USER CREDENTIALS FROM INPUTTED DATA

(71) Applicant: GitHub, Inc., San Francisco, CA (US)

(72) Inventor: Vicent Marti, Berlin (DE)

(73) Assignee: GitHub, Inc., San Francisco, CA (US)

( * ) Notice: Subject to any disclaimer, the term of this patent is extended or adjusted under 35 U.S.C. 154(b) by 47 days.

(21) Appl. No.: 14/594,016

(22) Filed: Jan. 9, 2015

(51) Int. Cl.
*H04L 9/00* (2006.01)
*G06F 21/64* (2013.01)
*G06F 21/46* (2013.01)

(52) U.S. Cl.
CPC ............. *G06F 21/64* (2013.01); *G06F 21/46* (2013.01)

(58) Field of Classification Search
CPC ........... G06F 21/46; G06F 21/45; H04L 63/20
USPC ......................................................... 726/4–7
See application file for complete search history.

(56) References Cited

U.S. PATENT DOCUMENTS

| | | | |
|---|---|---|---|
| 6,681,034 B1 | 1/2004 | Russo | |
| 8,412,931 B2* | 4/2013 | Vedula | H04L 63/08 713/161 |
| 8,955,074 B2* | 2/2015 | Barton | H04L 63/08 713/182 |
| 2003/0035585 A1 | 2/2003 | Osborne et al. | |
| 2005/0120213 A1* | 6/2005 | Winget | H04L 63/0442 713/171 |
| 2007/0152854 A1 | 7/2007 | Copley | |
| 2008/0098464 A1* | 4/2008 | Mizrah | G06F 21/36 726/5 |
| 2010/0175127 A1* | 7/2010 | Ponnambalam | G06F 21/34 726/18 |
| 2010/0191970 A1* | 7/2010 | Singer | H04L 9/083 713/171 |
| 2011/0197070 A1* | 8/2011 | Mizrah | H04L 63/0869 713/176 |
| 2012/0131653 A1* | 5/2012 | Pasquero | G06F 21/34 726/6 |
| 2013/0283363 A1* | 10/2013 | Rautenberg | G06F 21/31 726/7 |
| 2014/0115670 A1* | 4/2014 | Barton | H04L 9/3228 726/4 |
| 2014/0115679 A1* | 4/2014 | Barton | G09C 5/00 726/7 |
| 2014/0173705 A1* | 6/2014 | Manning | H04L 63/08 726/6 |
| 2014/0244604 A1* | 8/2014 | Oltean | H03M 7/30 707/693 |
| 2015/0013006 A1 | 1/2015 | Shulman et al. | |

(Continued)

*Primary Examiner* — Haresh N Patel
(74) *Attorney, Agent, or Firm* — Van Pelt, Yi & James LLP

(57) ABSTRACT

A system for detecting user credentials comprising a data chunker, a data chunk storage, a bytewise checker, a bit counter, and a credential checker. The data chunker is for determining a data chunk. The data chunk storage is for storing the data chunk. The bytewise checker is for checking that each byte of the data chunk comprises an appropriate value. The bit counter is for: determining a continuous number of bytes greater than or equal to the threshold byte value; and in the event the continuous number of bytes is greater than or equal to a threshold number of bytes, determining a credential address range corresponding to the continuous number of bytes. The credential checker is for determining whether data stored in the data chunk storage corresponding to the credential address range comprises a credential.

19 Claims, 11 Drawing Sheets

(56) References Cited

U.S. PATENT DOCUMENTS

2015/0222501 A1* 8/2015 Dettori .................... H04L 41/50
709/223
2015/0341327 A1* 11/2015 Barton .................. H04L 9/3226
713/168

* cited by examiner

450

| Value | Char | Value | Char | Value | Char | Value | Char |
|---|---|---|---|---|---|---|---|
| 000 | [null] | 032 | [space] | 064 | @ | 096 | ` |
| 001 | [start of heading] | 033 | ! | 065 | A | 097 | a |
| 002 | [start of text] | 034 | " | 066 | B | 098 | b |
| 003 | [end of text] | 035 | # | 067 | C | 099 | c |
| 004 | [end of transmission] | 036 | $ | 068 | D | 100 | d |
| 005 | [enquiry] | 037 | % | 069 | E | 101 | e |
| 006 | [acknowledge] | 038 | & | 070 | F | 102 | f |
| 007 | [bell] | 039 | ' | 071 | G | 103 | g |
| 008 | [backspace] | 040 | ( | 072 | H | 104 | h |
| 009 | [horizontal tab] | 041 | ) | 073 | I | 105 | i |
| 010 | [line feed] | 042 | * | 074 | J | 106 | j |
| 011 | [vertical tab] | 043 | + | 075 | K | 107 | k |
| 012 | [form feed] | 044 | , | 076 | L | 108 | l |
| 013 | [carriage return] | 045 | - | 077 | M | 109 | m |
| 014 | [shift out] | 046 | . | 078 | N | 110 | n |
| 015 | [shift in] | 047 | / | 079 | O | 111 | o |
| 016 | [data link escape] | 048 | 0 | 080 | P | 112 | p |
| 017 | [device control 1] | 049 | 1 | 081 | Q | 113 | q |
| 018 | [device control 2] | 050 | 2 | 082 | R | 114 | r |
| 019 | [device control 3] | 051 | 3 | 083 | S | 115 | s |
| 020 | [device control 4] | 052 | 4 | 084 | T | 116 | t |
| 021 | [negative acknowledge] | 053 | 5 | 085 | U | 117 | u |
| 022 | [synchronous idle] | 054 | 6 | 086 | V | 118 | v |
| 023 | [end of transmission block] | 055 | 7 | 087 | W | 119 | w |
| 024 | [cancel] | 056 | 8 | 088 | X | 120 | x |
| 025 | [end of medium] | 057 | 9 | 089 | Y | 121 | y |
| 026 | [substitute] | 058 | : | 090 | Z | 122 | z |
| 027 | [escape] | 059 | ; | 091 | [ | 123 | { |
| 028 | [file separator] | 060 | < | 092 | \ | 124 | | |
| 029 | [group separator] | 061 | = | 093 | ] | 125 | } |
| 030 | [record separator] | 062 | > | 094 | ^ | 126 | ~ |
| 031 | [unit separator] | 063 | ? | 095 | _ | 127 | [del] |

Fig. 4B

DETECTING USER CREDENTIALS FROM INPUTTED DATA

BACKGROUND OF THE INVENTION

An online software repository hosts code for software developers. The online software repository assists with project sharing, collaboration, version control, etc. Software developers can upload their code to the software repository for sharing. Code can be stored in a public repository, a semi-public repository, a private repository, etc. Some software includes user credentials (e.g., credentials for authenticating a user for a service). User credentials typically take the form of a string of hexadecimal numbers. Credentials for different services have different distinguishing characteristics (e.g., length, digit patterns, known digits, etc.). Code including user credentials should only be stored not be shared publicly.

BRIEF DESCRIPTION OF THE DRAWINGS

Various embodiments of the invention are disclosed in the following detailed description and the accompanying drawings.

FIG. 4B is a diagram illustrating an embodiment of an American Standard Code for Information Interchange (e.g., ASCII) table.

DETAILED DESCRIPTION

Figure 1:
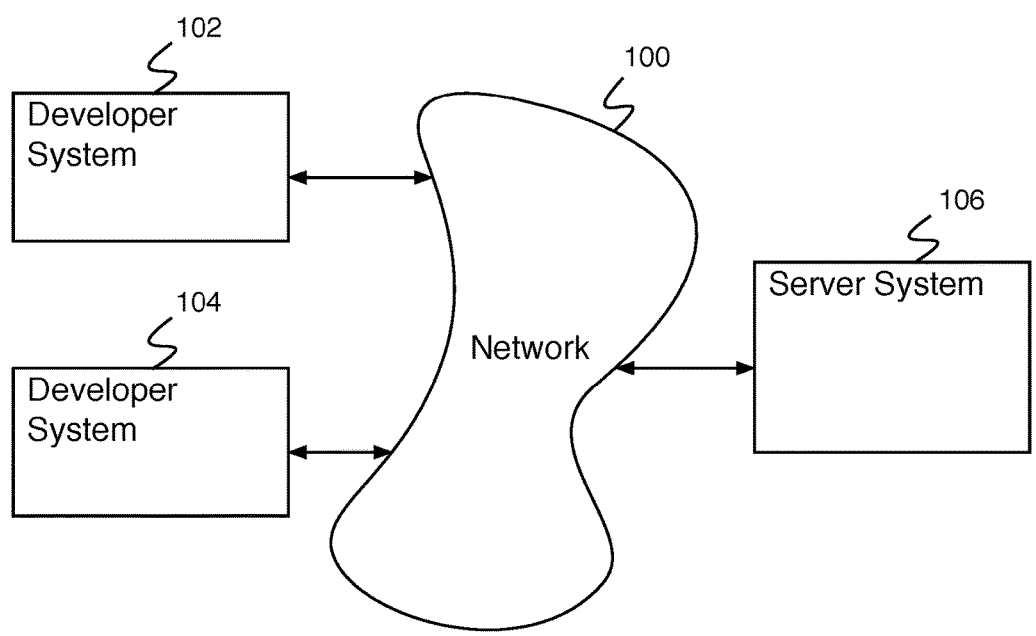
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for detecting user credentials comprises an input interface for receiving data; a data chunker for determining a data chunk; a data chunk storage for storing the data chunk and providing data in response to a data address range; a bytewise checker for checking that each byte of the data chunk comprises an appropriate value; a bit counter for determining a continuous number of bit above the threshold value; and in the event the continuous number of bits is above a threshold number of bits, determining a credential address range corresponding to the continuous number of bits, and providing the credential address range to the data chunk storage; and a credential checker for receiving data corresponding to the credential address range from the data chunk storage and determining whether the data comprises a credential.

A system for efficiently detecting user credentials is disclosed. The system for efficiently detecting user credentials operates in-line at the data input to an online software repository. As code is uploaded to the online software repository, in the event that it is destined for a public portion of the repository, it is scanned by the system for efficiently detecting user credentials. In the event that the system for efficiently detecting user credentials determines that a user credential is present, the system prevents the credential from being shown publicly (e.g., it deletes the credential, instructs the user to replace the credential with something else, designates the code for a private portion of the repository, etc.). User credentials typically conform to easily identifiable patterns, and thus can be identified using a simple pattern-matching algorithm (e.g., a regular expression). However, processing all code input to the online software repository using the pattern-matching algorithm is computationally prohibitive. The system for efficiently detecting user credentials reduces the processing load of analyzing all incoming code for user credentials by a factor of at least 10. The user credentials uploaded into a public repository represent a significant security threat. In some embodiments, publication of credentials enables misuse of the credentials with economic consequences (e.g., mischarging of accounts).

In some embodiments, the system for efficiently detecting user credentials speeds the detection of user credentials by simplifying the processing that needs to be performed on the input stream. Rather than performing a pattern-matching algorithm on the input data stream as each byte passes by, the system takes advantage of the fact that user credentials typically take the form of a long string of alphanumeric characters (e.g., 20 or more), a pattern that does not occur commonly. The system reduces each byte to one bit by checking the value of the input byte to distinguish alphanumeric and non-alphanumeric characters. Strings of positive bits (e.g., indicating alphanumeric characters) longer than a threshold for identifying credentials are isolated, and the corresponding characters are then analyzed using techniques to detect credentials. In some embodiments, performance is further improved by using a parallel processor to perform the thresholding task.

In some embodiments, the system for efficiently detecting user credentials receives incoming code for processing using an input interface. The system then breaks the incoming code into chunks using a data chunker. In some embodiments, the data chunker breaks the incoming code into chunks of a fixed size (e.g., 16 bytes). In some embodiments, processing of a data chunk occurs on each byte of the chunk in parallel (e.g., using a single instruction multiple data— e.g., SIMD—parallel processor), and the data chunker breaks the incoming data into appropriately sized chunks for the parallel processor. Data chunks are stored by a data chunk storage and processed by a bytewise checker. In some embodiments, the bytewise checker determines whether the value of each byte of the data chunk is an appropriate value (e.g., within a range of ASCII values, a legal credential value, etc.) and replaces the byte with a 1 bit in the event that it is appropriate, and a 0 bit in the event that it is not. In some embodiments, the bytewise checker comprises a parallel processor (e.g., a SIMD processor). Bits output by the bytewise checker are processed by a bit counter. In some embodiments, the bit counter determines the length of continuous strings of 1 bits in the checked data chunk. In the event that the bit counter determines that there is a continuous string of 1 bits in the checked data chunk longer than a threshold (e.g., the minimum length of a credential), the corresponding data is to be analyzed. The bit counter determines the storage addresses of the associated data (e.g., in the data chunk storage) and requests the original data be provided to a credential checker. In some embodiments, the credential checker receives data from the data chunk storage and processes it to determine whether it comprises a credential (e.g., using a pattern-matching algorithm, a regular expression, a heuristic, etc.).

FIG. 1 is a block diagram illustrating an embodiment of a network system. In some embodiments, the network system of FIG. 1 comprises a system for efficiently detecting user credentials. In some embodiments, the network system of FIG. 1 provides communication between any appropriate number of software developers and a version control server system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, developer system 102 and developer system 104 comprise systems for use by a software developer while developing software. In various embodiments, there are 1, 6, 22, 122, 1059, or any other appropriate number of developer systems communicating with network 100. Server system 106 comprises a server system for storing data. In some embodiments, server system 106 comprises an online software repository. In various embodiments, server system 106 comprises a system for storing software, for enabling collaboration, for providing version control, for publishing software, or for any other appropriate purpose. In various embodiments, code stored on server system 106 is stored privately, semi-privately, publicly, or in any other appropriate way. In some embodiments, code comprising user credentials should not be stored publicly on server system 106.

Figure 2:
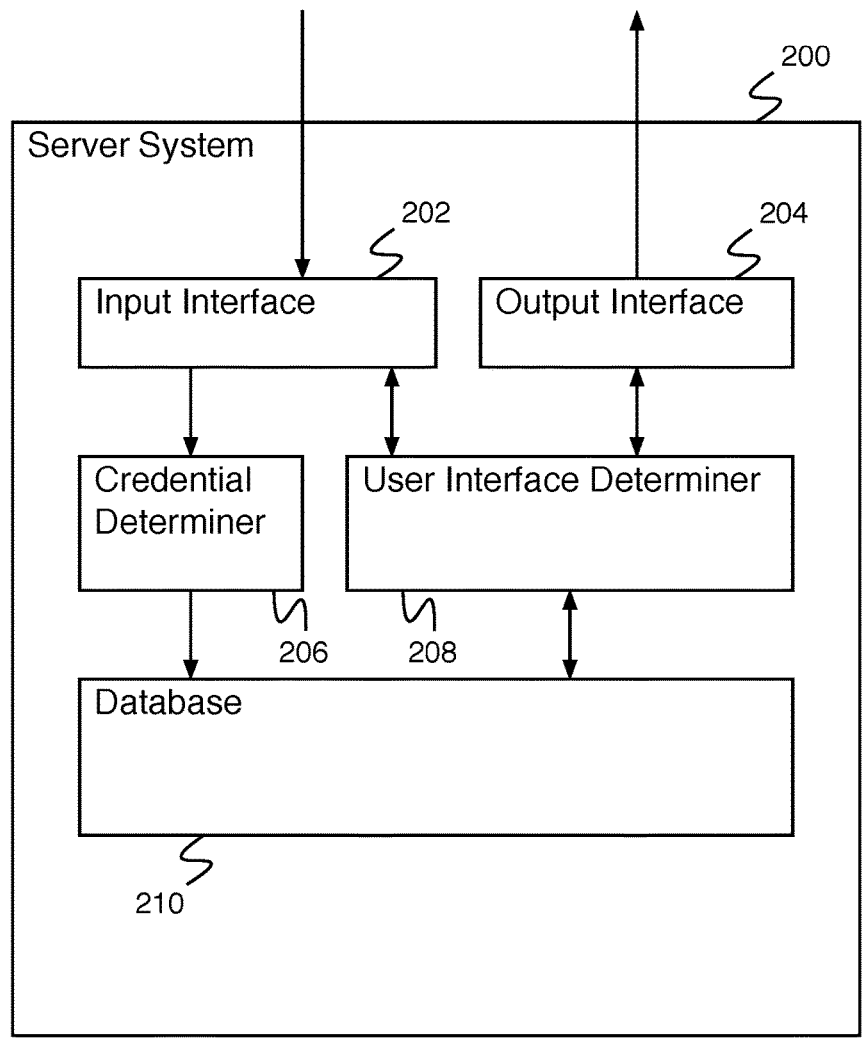
FIG. 2 is a block diagram illustrating an embodiment of a server system.

FIG. 2 is a block diagram illustrating an embodiment of a server system. In some embodiments, server system 200 comprises server system 106 of FIG. 1. In the example shown, server system 200 comprises input interface 202. In various embodiments, input interface 202 receives user interface commands, data uploads, code to be stored, or any other appropriate information. Input interface 202 communicates with user interface determiner 208 for controlling a user interface. User interface determiner 208 determines a user interface (e.g., in response to user interface commands received from input interface 202). In some embodiments, the user interface includes data retrieved from database 210. User interface determiner provides the user interface to output interface 204 for communication to a user. In some embodiments, a user provides code to be stored in database 210. In some embodiments, when input interface 202 receives code from a user, the code is provided to credential determiner 206. Credential determiner 206 processes the incoming code to determine whether it contains a credential. In some embodiments, in the event it is determined that the code does not contain a credential, the code is provided to database 210. In various embodiments, in the event it is determined that the code contains a credential, the credential is deleted, the user is prompted for an action, the code storage is indicated as private, or any other appropriate action is performed.

Figure 3:
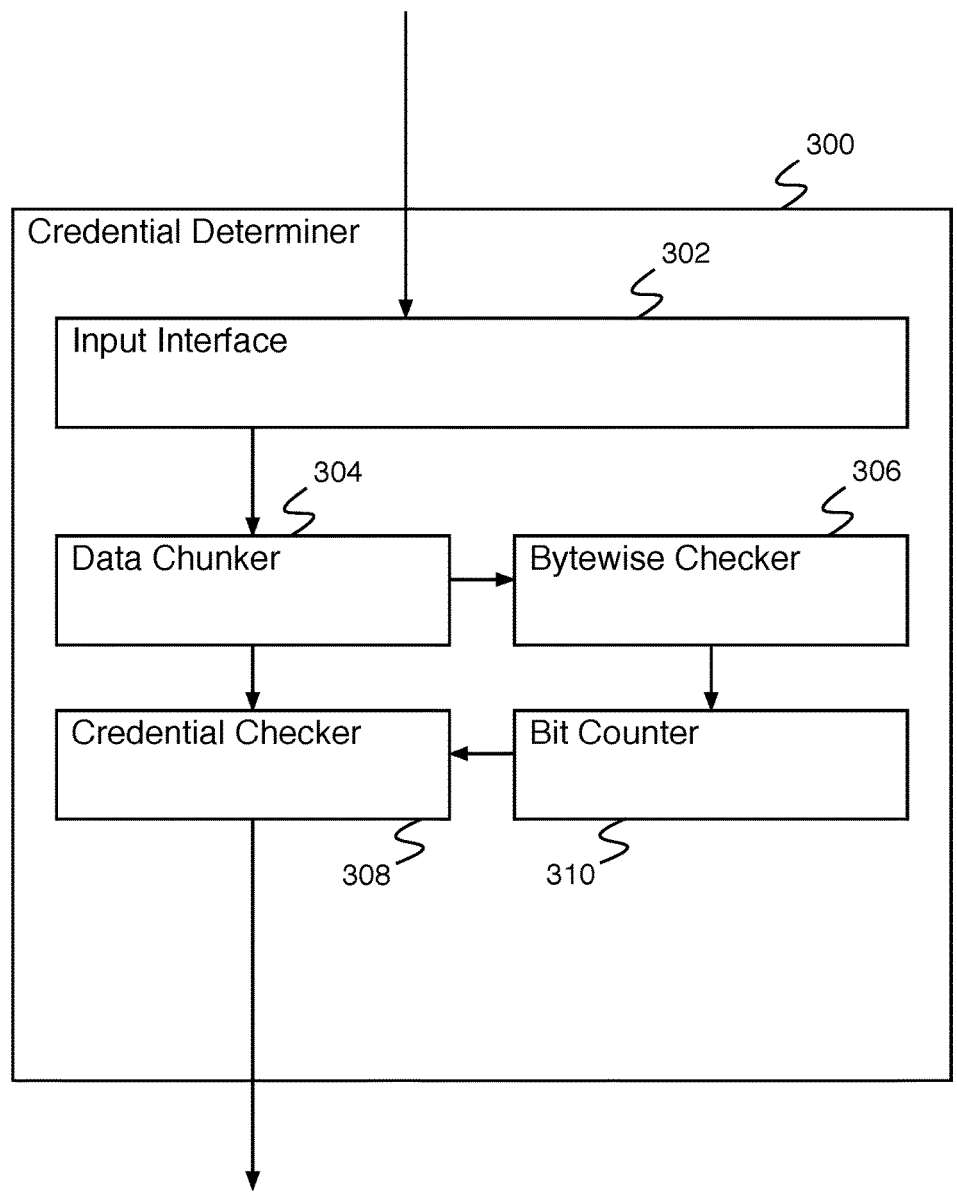
FIG. 3 is a block diagram illustrating an embodiment of a credential determiner.

FIG. 3 is a block diagram illustrating an embodiment of a credential determiner. In some embodiments credential determiner 300 comprises credential determiner 206 of FIG. 2. In the example shown, credential determiner 300 comprises input interface 302 for receiving input data and providing the input data to data chunker 304. In some embodiments, input interface 302 is implemented using a processor. Data chunker 304 comprises a data chunker for breaking input data into data chunks. In some embodiments, the data chunks are of a fixed size. In some embodiments, the data chunks are of a fixed size appropriate for a parallel processor (e.g., a parallel processor implementing bytewise checker 306). Data chunker 304 provides data chunks to credential checker 308 and bytewise checker 306. In some embodiments, data chunker 304 is implemented using a processor. Bytewise checker 306 comprises a bytewise checker for checking that each byte of a received data chunk has an appropriate value (e.g., is within a range of ASCII values, is above a threshold ASCII value, is below a threshold ASCII value, is an appropriate credential value, etc.). In some embodiments, bytewise checker 306 produces a data word with a number of bits equal to the number of bytes in the received data chunk. In some embodiments, each bit in the data word produced by bytewise checker 306 comprises a one in the event that the corresponding byte in the received data chunk is appropriate, and a zero in the event that the corresponding byte in the received data chunk is not appropriate. In some embodiments, an appropriate value is determined using a threshold that is chosen such that bytes corresponding to alphanumeric characters are above the threshold and bytes not corresponding to alphanumeric characters are not above the threshold. In some embodiments, the bytewise checker 306 determines whether the byte is within a range of values (e.g., printable characters, alphanumeric characters, alphabetical characters, credential legal characters, etc.). In some embodiments, the threshold comprises an upper threshold (e.g., bytes are less than a negative number). In some embodiments, bytewise checker 306 comprises a parallel processor (e.g., a SIMD processor) for checking all bytes of the received data chunk simultaneously. In some embodiments, bytewise checker provides the determined data word to bit counter 310. In some embodiments, bytewise checker 306 is implemented using a processor. Bit counter 310 comprises a bit counter for counting bits. In some embodiments, bit counter 310 counts consecutive strings of ones found in data words received from bytewise checker 306. In some embodiments, bit counter 310 accounts for consecutive strings of ones extending from one data chunk to the next data chunk (e.g., in the event that a string of ones continues until the end of a data chunk, its length is increased by the length of the string of ones found at the start of the next data chunk). In some embodiments, in the event that a string of ones determined by bit counter 310 is longer than a threshold length (e.g., the string of ones indicates a data segment that possibly comprises a credential), bit counter 310 determines an address range corresponding to the string of ones and provides the address range to credential checker 308. In some embodiments, bit counter 310 is implemented using a processor. Credential checker 308 stores data chunks received from data chunker 304. In some embodiments, in the event credential checker 308 receives an indication from bit counter 310 that a data chunk does not include a credential, credential checker 308 releases one or more data chunks (e.g., for storage in a database). In some embodiments, in the event that credential checker 308 receives an address range indicating a possible credential from bit counter 310, data chunk storage 308 retrieves the data segment corresponding to the address range (e.g., from one or more data chunks) and checks the segment for a credential. In various embodiments, credential checking is performed using a comprises a regular expression pattern matcher, a heuristic pattern matcher, a data filter, or any other appropriate credential checker. In some embodiments, in the event that credential checker 308 determines that a data chunk does not include a credential, credential checker 308 releases a data chunk (e.g., for storage in a database). In some embodiments, credential checker 308 is implemented using a processor. In various embodiments, in the event credential checker 308 determines that a data segment comprises a credential, the credential is deleted, the user is prompted for an action, the code storage is indicated as private, or any other appropriate action is performed. In various embodiments, modules of credential determiner 300 are all implemented on a single processor, are each implemented on separate processors, are implemented combined onto multiple processors in any appropriate way, or are implemented in any other appropriate way.

Figure 4A:
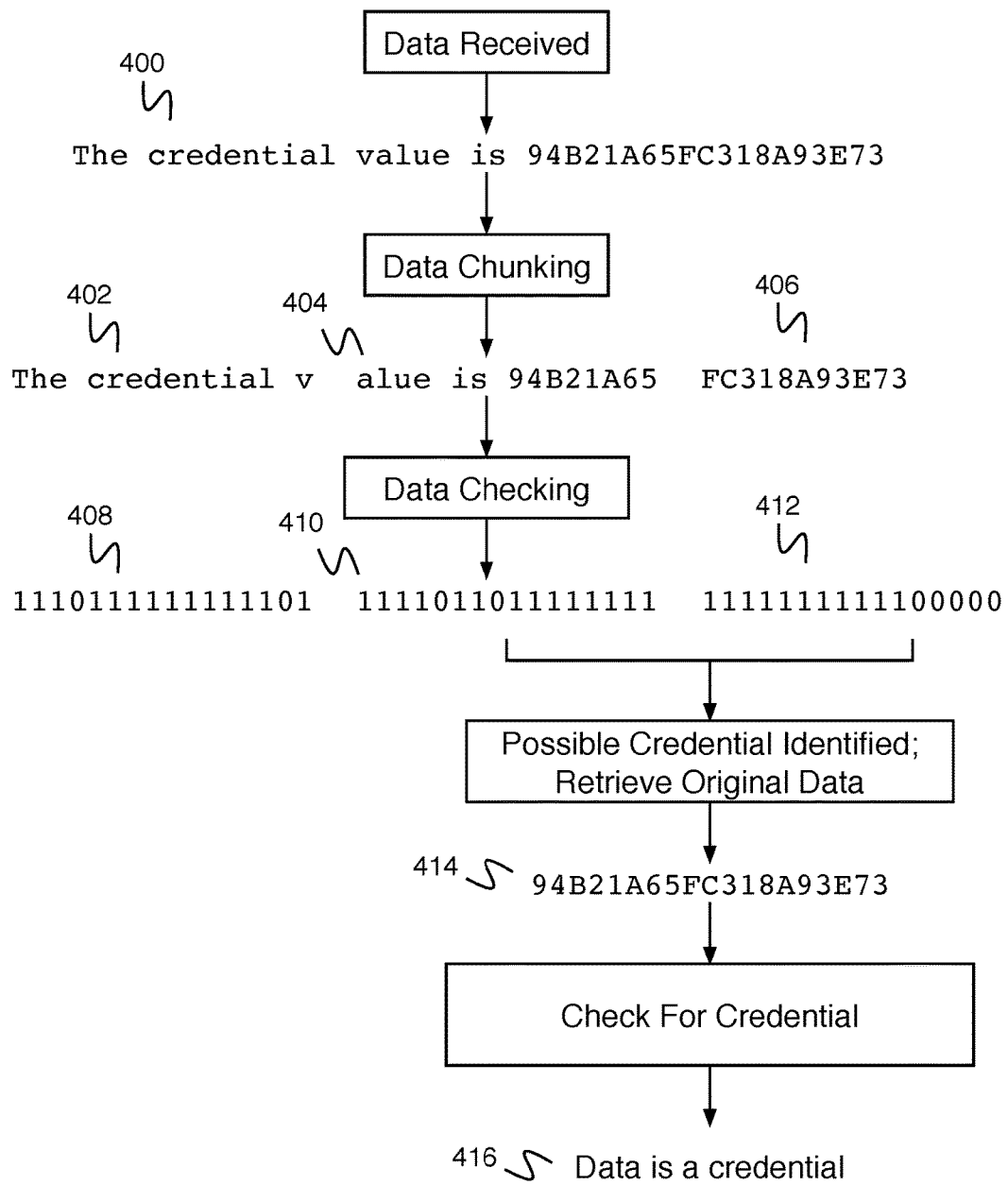
FIG. 4A is a diagram illustrating an embodiment of a data flow.

FIG. 4A is a diagram illustrating an embodiment of a data flow. In some embodiments, the data flow of FIG. 4 comprises a data flow through a credential determiner (e.g., credential determiner 300 of FIG. 3). In the example shown, data 400 is received (e.g., by an input interface). Data 400 comprises a data segment found within a section of code. Data 400 comprises a credential (e.g., 94B21A65FC318A93E73). Data 400 is chunked (e.g., by a data chunker) to produce data chunk 402, data chunk 404 and data chunk 406. Each data chunk is checked (e.g., by a bytewise checker) to produce bit segments 408, 410, and 412. The bit segments are counted (e.g., by a bit counter) to identify strings of ones longer than a threshold (e.g., 19 ones). The string of ones corresponding to the credential is identified as a possible credential, and the original data (e.g., data 414) associated with the string of ones is retrieved (e.g., from a data chunk storage). The data is checked for a credential (e.g., by a credential checker). The credential checker identifies the credential and produces a positive output (e.g., data is a credential output 416).

FIG. 4B is a diagram illustrating an embodiment of an American Standard Code for Information Interchange (e.g., ASCII) table. In some embodiments, ASCII comprises an encoding scheme for text characters and control characters. In the example shown, control characters (e.g., non-text characters) are represented by ASCII values 001 through 032 as well as 127. Text characters are represented by ASCII values 33 through 126. Text characters can efficiently be distinguished from non-text characters by thresholding the ASCII character representation at 32, replacing values 33 and above with a one bit (e.g., indicating a text character) and 32 and below with a zero bit (e.g., indicating a non-text character). In some embodiments, presence of ASCII value 127 (e.g., an indication of a deletion operation) is detected using a second operation (e.g., to reset the value to a zero bit, indicating a non-text character). In some embodiments, ASCII value 127 is used to transmit an indication of a deletion operation (e.g., from a keyboard to a computer) but is not stored as part of text data, and thus will never be detected in an ASCII thresholding operation. In some embodiments, a bytewise thresholder determines whether the byte is within a range of ASCII values (e.g., printable characters, alphanumeric characters, alphabetical characters, credential legal characters, etc.). In some embodiments, a bytewise thresholder determines an upper threshold (e.g., bytes are less than a negative number).

Figure 5:
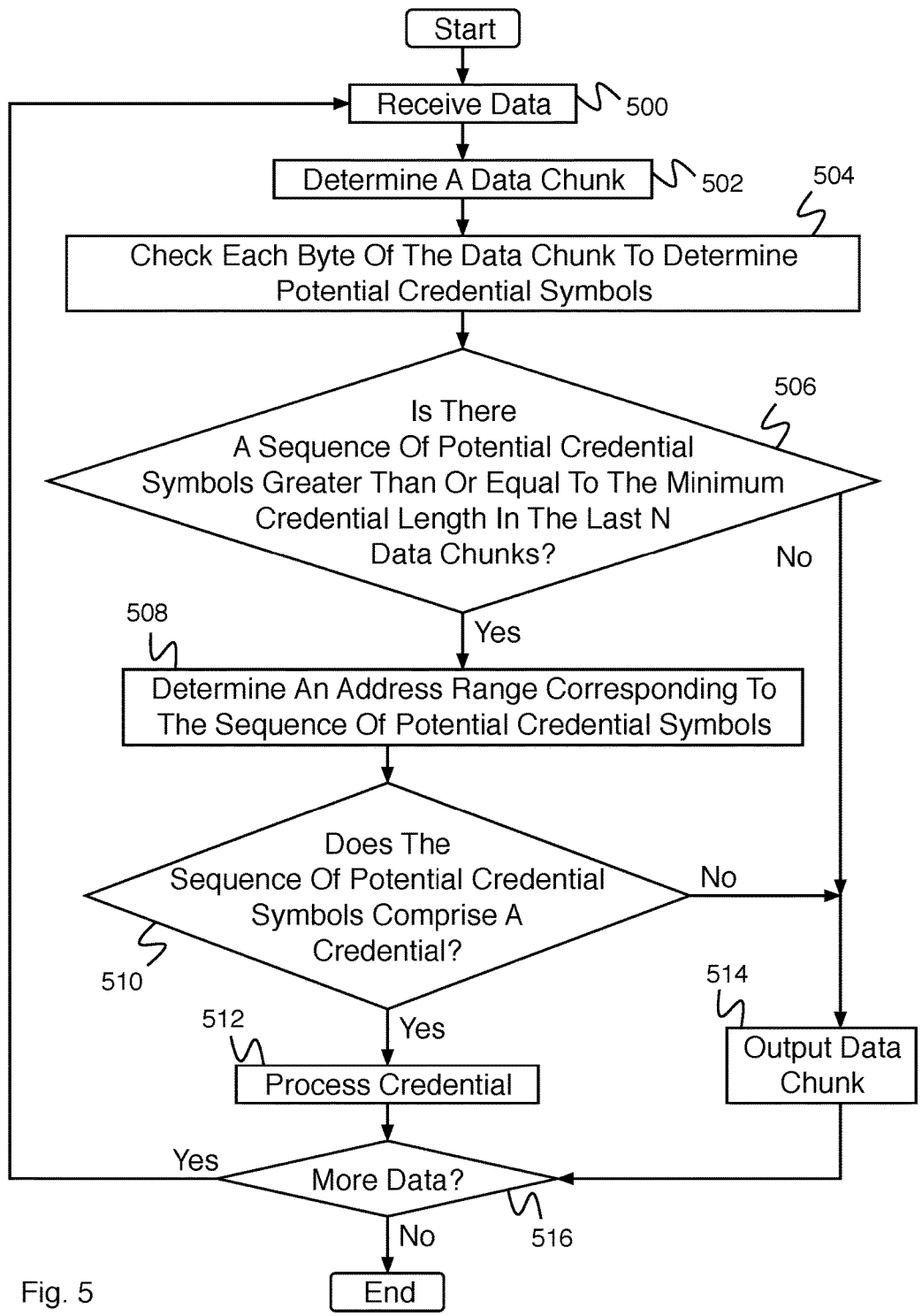
FIG. 5 is a flow diagram illustrating an embodiment of a process for detecting a credential.

FIG. 5 is a flow diagram illustrating an embodiment of a process for detecting a credential. In some embodiments, the process of FIG. 5 is implemented by a credential determiner (e.g., credential determiner 300 of FIG. 3). In the example shown, in 500, data is received. In 502, a data chunk is determined. In 504, each byte of the data chunk is checked to determine potential credential symbols. In some embodiments, a byte of the data chunk is replaced with a zero bit in the event it does not comprise a potential credential symbol, and a one bit in the event it does comprise a potential credential symbol. In some embodiments, it is determined whether each byte is within a range of values (e.g., printable characters, alphanumeric characters, alphabetical characters, credential legal characters, etc.). In some embodiments, it is determined whether each byte is above a lower threshold (e.g., bytes are greater than a positive number). In some embodiments, it is determined whether each byte is below an upper threshold (e.g., bytes are less than a negative number). In 506, it is determined whether there is a sequence of potential credential symbols greater than or equal to the minimum credential length in the last N data chunks. In various embodiments, N comprises one of the following number of chunks: 1 chunk, 2 chunks, 3 chunks, 4 chunks, 5 chunks, 6 chunks, 7 chunks, 8 chunks, 9 chunks, 10 chunks, 11 chunks, 12 chunks, 13 chunks, 14 chunks, 15 chunks, 16 chunks, or any other appropriate number of chunks. In some embodiments, the last N data chunks (e.g., data chunks determined in 502) are concatenated and scanned for a sequence of potential credential symbols greater than or equal to the minimum credential length. In some embodiments, the number N of data chunks concatenated and scanned comprises the maximum number of data chunks a credential can span (e.g., a 20-bit credential can span 3 16-bit chunks). In some embodiments, the thresholded representations of the last N data chunks are stored in a first in first out buffer for scanning. In the event it is determined that there is not a sequence of potential credential symbols greater than or equal to the minimum credential length in the last N data chunks, control passes to 514. In the event it is determined that there is a sequence of potential credential symbols greater than or equal to the minimum credential length in the last N data chunks, control passes to 508. In 508, an address range corresponding to the sequence of potential credential symbols is determined. In 510, it is determined whether the sequence of potential credential symbols comprises a credential. In the event it is determined that the sequence of potential credential symbols does not comprise a credential, control passes to 514. In the event it is determined that the sequence of potential credential symbols comprises a credential, control passes to 512. In 512, the credential is processed. In various embodiments, processing the credential comprises deleting the credential, indicating to mark the repository the credential is to be stored in as private, prompting a user for an indication of what to do with the credential, or processing the credential in any other appropriate way. Control then passes to 516. In 514, the data chunk is output. In some embodiments, the data chunk output comprises the Nth of the N data chunks checked in 506. In some embodiments, the data chunk is output for storage in a database. Control then passes to 516. In 516, it is determined whether there is more data (e.g., more input data to be checked for credentials). In the event it is determined that there is more input data, control passes to 500. In the event it is determined that there is not more input data, the process ends.

Figure 6:
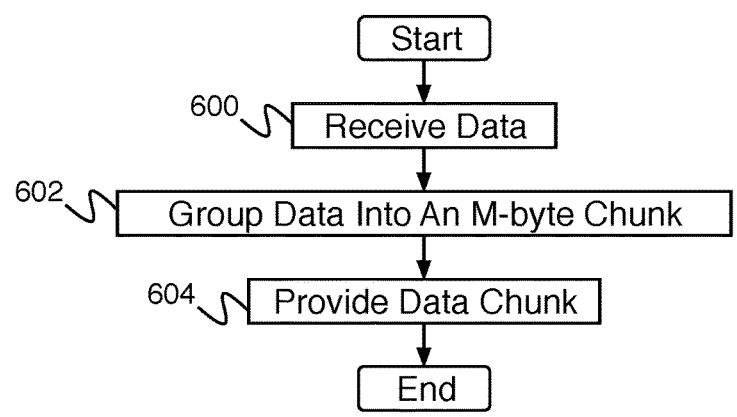
FIG. 6 is a flow diagram illustrating an embodiment of a process for a data chunker.

FIG. 6 is a flow diagram illustrating an embodiment of a process for a data chunker. In some embodiments, the process of FIG. 6 is executed by data chunker 304 of FIG. 3. In the example shown, in 600, data is received (e.g., by the data chunker). In 602, data is grouped into an M-byte data chunk. In some embodiments, grouping data into an M-byte data chunk comprises determining a most recent set of bytes, wherein the set of bytes is of a predetermined number of bytes (e.g., M comprises 4 bytes, 8 bytes, 16 bytes, 32 bytes, 64 bytes, 128 bytes, etc.). In 604, the data chunk is provided. In some embodiments, the data chunk is provided to a credential checker and to a bytewise thresholder.

Figure 7:
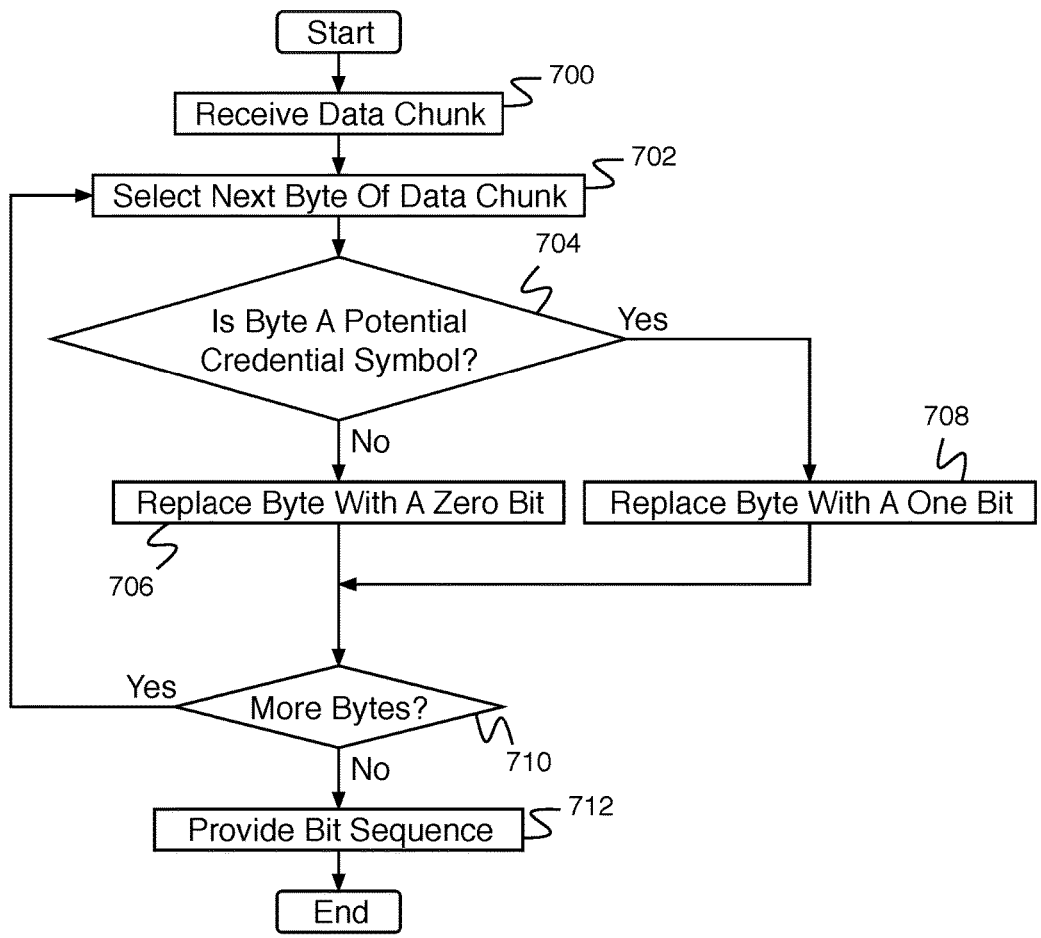
FIG. 7 is a flow diagram illustrating an embodiment of a bytewise thresholder.

FIG. 7 is a flow diagram illustrating an embodiment of a bytewise thresholder. In some embodiments, the process of FIG. 7 is executed by bytewise thresholder 306 of FIG. 3. In the example shown, in 700, a data chunk is received (e.g., from a data chunker). In 702, the next byte of the data chunk is selected. In some embodiments, the next byte of the data chunk comprises the first byte of the data chunk. In 704, it is determined whether the byte value is a potential credential symbol. In some embodiments, the byte value comprises an ASCII value. In some embodiments, it is determined whether the byte value is within a range of values (e.g., printable characters, alphanumeric characters, alphabetical characters, credential legal characters, etc.). In some embodiments, it is determined whether the byte value is less than a threshold value the threshold (e.g., bytes are less than a negative number). In some embodiments, the threshold value is chosen such that byte values corresponding to alphanumeric characters are above the threshold and byte values not corresponding to alphanumeric characters are less than or equal to the threshold. In the event it is determined that the byte value is not a potential credential symbol, control passes to 706. In 706, the byte is replaced with a zero bit. Control then passes to 710. In 704, in the event it is determined that the byte value is a potential credential symbol, control passes to 708. In 708, the byte is replaced with a one bit. Control then passes to 710. In 710, it is determined whether there are more bytes (e.g., more bytes in the data chunk). In the event it is determined that there are more bytes, control passes to 702. In the event it is determined that there are not more bytes, control passes to 712. In 712, the bit sequence (e.g., the bit sequence created by replacing each byte of the received data chunk with either a zero or a one) is provided. In the example shown, bytes are checked by a bytewise checker serially (e.g., one a time). In some embodiments, bytes are checked by the bytewise checker in parallel (e.g., all at once). Each byte is checked and replaced by a zero or a one at the same time. In some embodiments, parallel processing in this way can be implemented using a SIMD parallel processor. In some embodiments, a SIMD parallel processor performs the same instructions on each byte of a fixed length data chunk all at the same time. In some embodiments, processing with a SIMD parallel processor necessitates data chunking.

Figure 8:
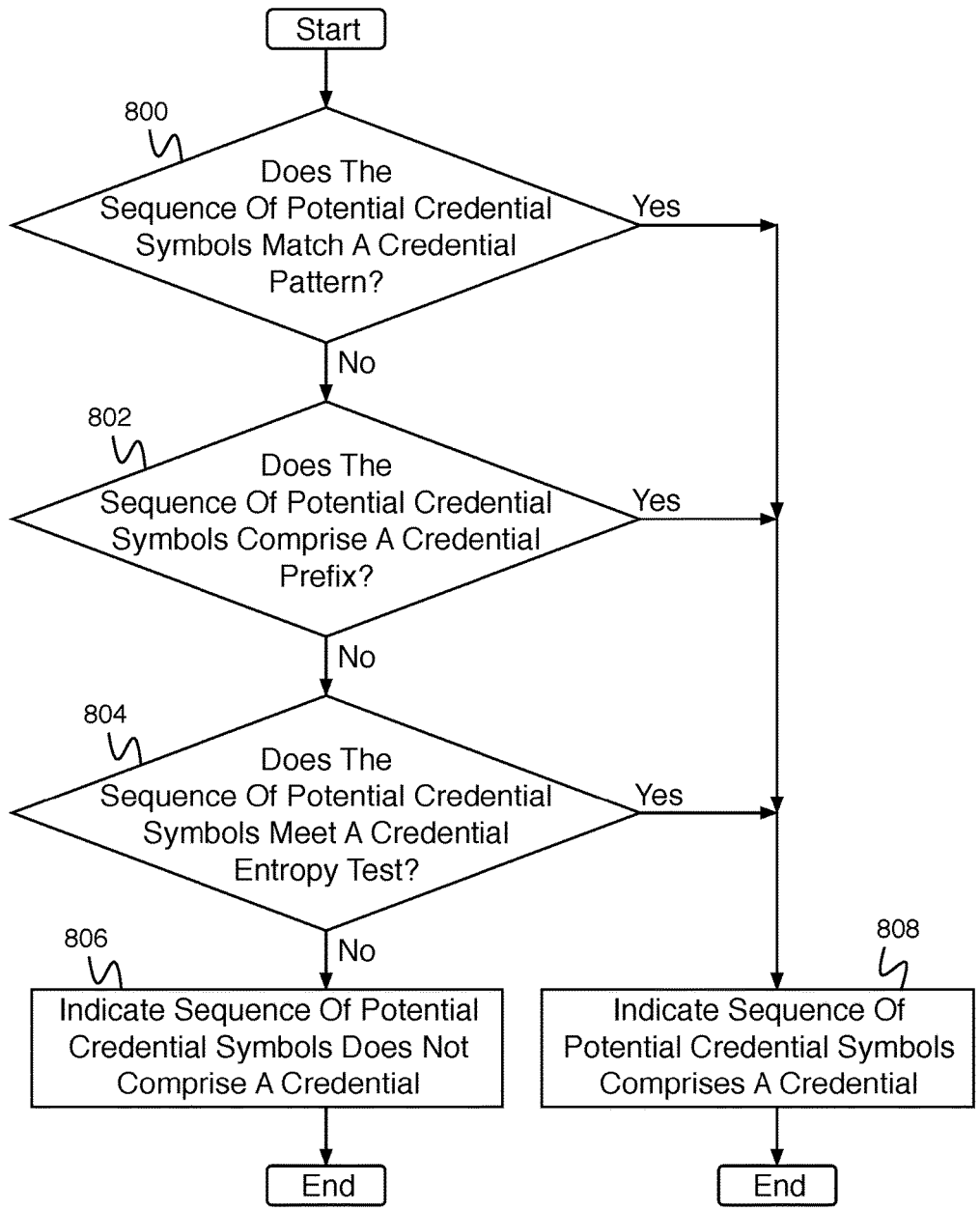
FIG. 8 is a flow diagram illustrating an embodiment of a process for determining whether a sequence of potential credential symbols comprises a credential.

FIG. 8 is a flow diagram illustrating an embodiment of a process for determining whether a sequence of potential credential symbols comprises a credential. In some embodiments, the process of FIG. 8 implements 510 of FIG. 5. In the example shown, in 800, it is determined whether the sequence of potential credential symbols matches a credential pattern. In various embodiments, it is determined whether the sequence of potential credential symbols matches a credential pattern using a regular expression, a pattern matching heuristic, a data filter, or any other appropriate pattern matching algorithm. In the event it is determined that the sequence of potential credential symbols matches a credential pattern, control passes to 808. In the event it is determined that the sequence of potential credential symbols does not match a credential pattern, control passes to 802. In 802, it is determined whether the sequence of potential credential symbols comprises a credential prefix. In some embodiments, a credential prefix comprises a character sequence known to introduce a credential. In the event it is determined that the sequence of potential credential symbols comprises a credential prefix, control passes to 808. In the event it is determined that the sequence of potential credential symbols does not comprise a credential prefix, control passes to 804. In 804, it is determined whether the sequence of potential credential symbols meets a credential entropy test. In some embodiments, a credential comprises higher entropy than regular text (e.g., written words, software code, etc.), and a determined entropy value for a set of characters can be thresholded to determine whether the set of characters comprises a threshold. In the event it is determined in 804 that the sequence of potential credential symbols meets a credential entropy test (e.g., indicating that the sequence comprises a credential), control passes to 808. In the event it is determined in 804 that the sequence of potential credential symbols does not meet a credential entropy test, control passes to 806. In 806, it is indicated that the sequence of potential credential symbols does not comprise a credential. The process then ends. In 808, it is indicated that the sequence of possible credential symbols comprises a credential.

In various embodiments, in the event that the data comprises a credential, one or more of the following are performed: the credential is deleted, the credential is replaced, a code is code associated with the credential is stored in a private portion of a repository, an indication is provided to a user or administrator that the credential has been uploaded, or any other appropriate action.

Figure 9A:
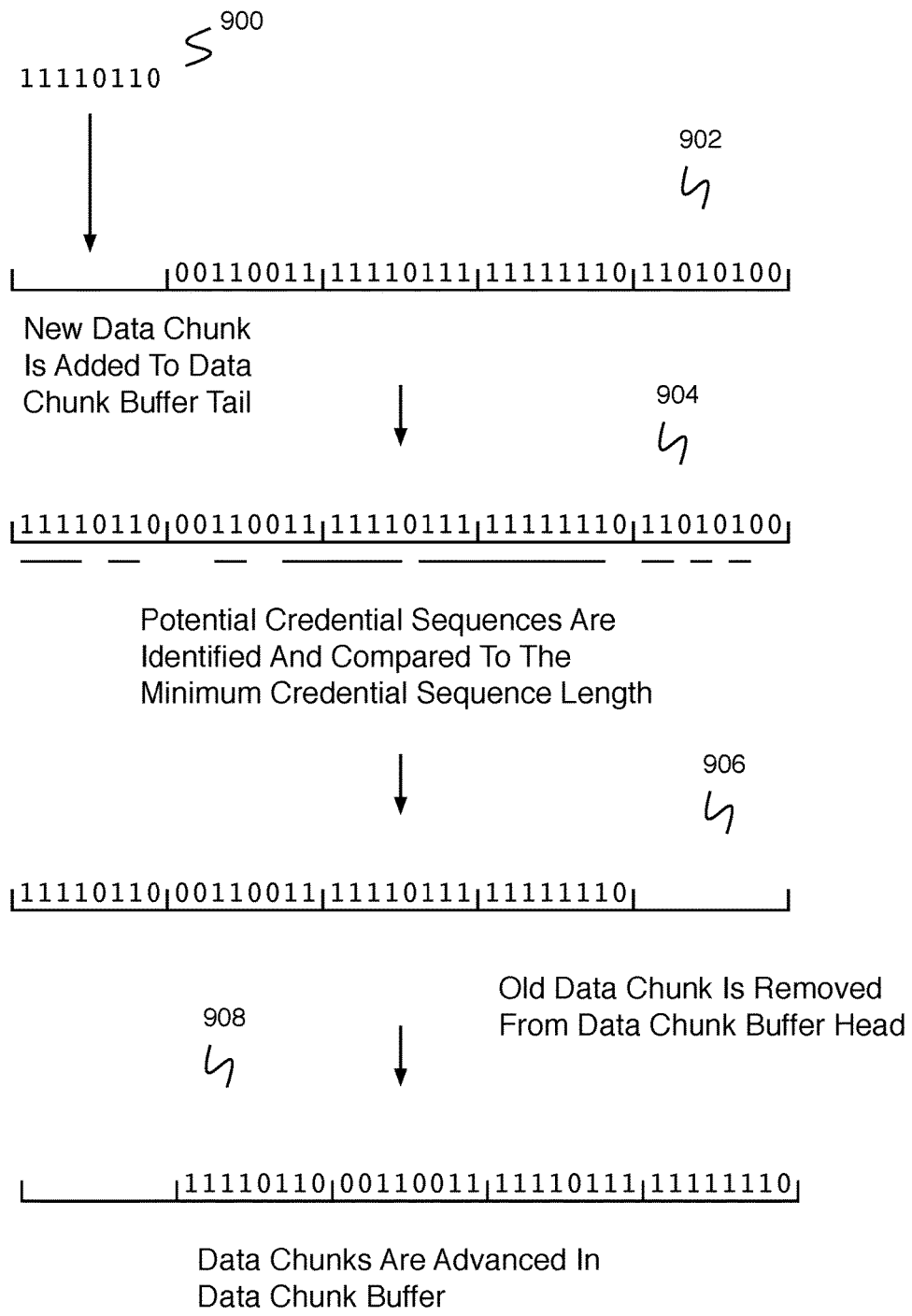
FIG. 9A is a diagram illustrating an embodiment of a data flow.

FIG. 9A is a diagram illustrating an embodiment of a data flow. In some embodiments, the data flow of FIG. 9 comprises a data flow through a bit counter (e.g., bit counter 310 of FIG. 3). In the example shown, data chunk 900 is received. Data chunk 900 is added to the tail position of data chunk buffer 902. In the example shown, data chunk buffer 902 comprises a buffer for holding 5 data chunks. In some embodiments, the number of data chunks stored by a data chunk buffer comprises the maximum number of data chunks a credential can span. Data chunk buffer 904 comprises data chunk buffer 902 including data chunk 900 in its tail position. Data chunk buffer 904 is scanned for potential credential sequences. In some embodiments, scanning data chunk buffer 904 for potential credential sequences comprises identifying sequences of potential credential symbols (e.g., one bits). In some embodiments, potential credential sequences comprise sequences of potential credential symbols longer than a minimum credential length. The first received data chunk in the data chunk buffer (e.g., the data chunk at the data chunk buffer head) is then removed from the data chunk buffer. Data chunk buffer 906 comprises data chunk buffer 904 with the data chunk at the data chunk buffer head removed. The remaining data chunks in the data chunk buffer are then advanced within the data chunk buffer to open a space at the data chunk buffer tail for a new data chunk. Data chunk buffer 908 comprises data chunk buffer 906 with the data chunks advanced within the buffer.

Figure 9B:
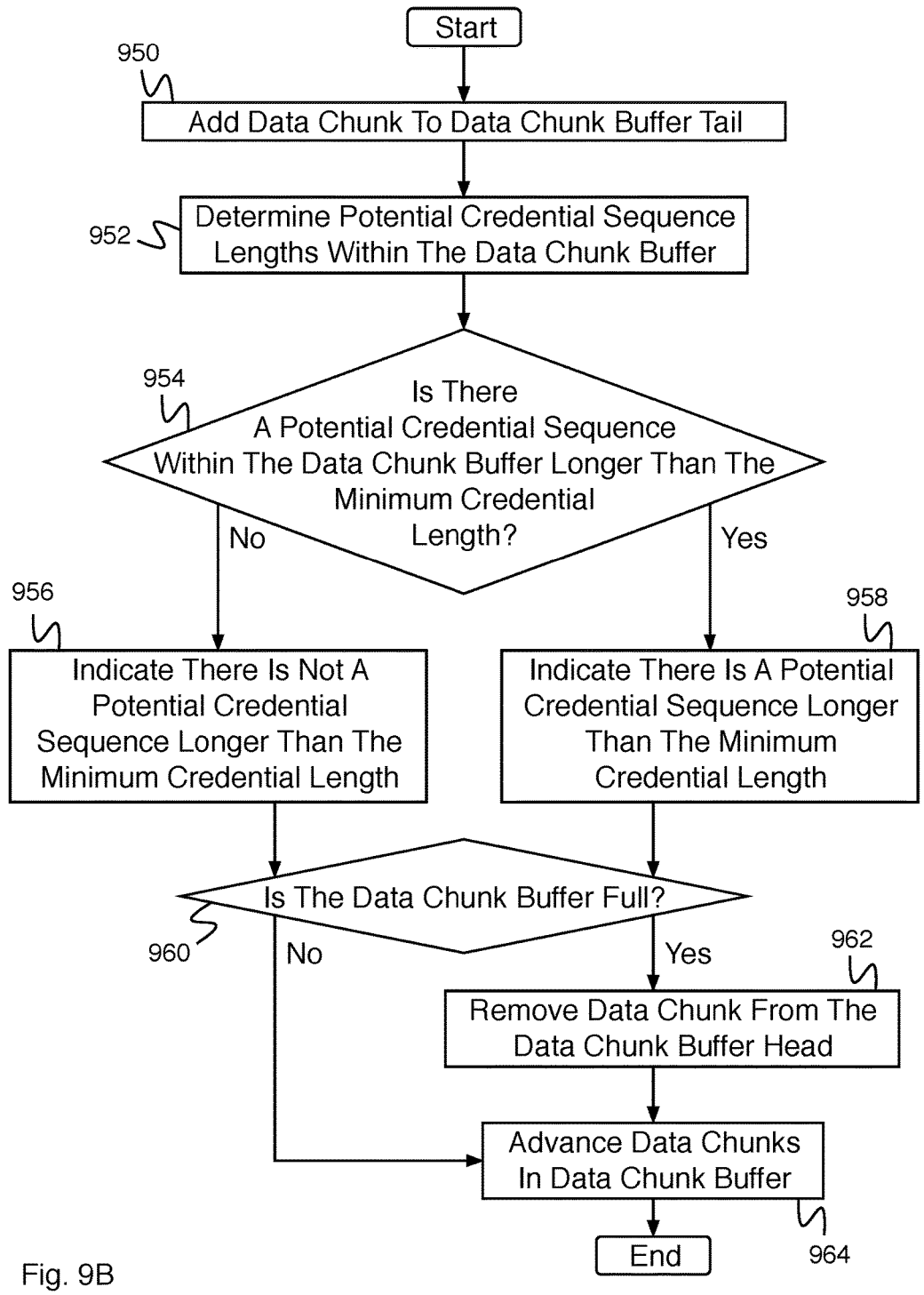
FIG. 9B comprises a flow diagram illustrating an embodiment of a process for determining whether there is a sequence of potential credential symbols greater than or equal to the minimum credential length in the last N data chunks.

FIG. 9B comprises a flow diagram illustrating an embodiment of a process for determining whether there is a sequence of potential credential symbols greater than or equal to the minimum credential length in the last N data chunks. In some embodiments, the process of FIG. 9B implements 506 of FIG. 5. In some embodiments, the process of FIG. 9B comprises a process for bit counter 310 of FIG. 3. In the example shown, in 950, a data chunk is added to a data chunk buffer tail. In some embodiments, the data chunk buffer comprises a first in first out buffer. In 952, potential credential sequence lengths within the data chunk buffer are determined. In 954 it is determined whether there is a potential credential sequence within the data chunk buffer longer than the minimum credential length. In the event it is determined that there is not a potential credential sequence longer than the minimum credential length, control passes to 956. In 956, it is indicated that there is not a potential credential sequence longer than the minimum credential length. Control then passes to 960. In the event it is determined in 854 that there is a potential credential sequence within the data chunk buffer longer than the minimum credential length, control passes to 958. In 958, it is indicated that there is a potential credential sequence longer than the minimum credential length. Control then passes to 960. In 960, it is determined whether the data chunk buffer is full. In some embodiments, the data chunk buffer is not full until it has received a number of data chunks equal to its length. In the event it is determined that the data chunk buffer is not full, control passes to 964. In the event it is determined that the data chunk buffer is full, control passes to 962. In 962, a data chunk is removed from the data chunk buffer head. In 964, data chunks are advanced in the data chunk buffer.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for detecting user credentials, comprising:
   determining, using a processor, a data chunk;
   storing, in a data chunk storage, the data chunk;
   checking that each byte of the data chunk comprises an appropriate value, wherein the appropriate value comprises a value in a range of ASCII values;
   determining whether a continuous number of bytes having the appropriate value is greater than or equal to a threshold number of bytes, comprising:
      analyzing each byte from a last N data chunks, wherein N corresponds to a positive integer value; and
      determining, from the last N data chunks, continuous bytes having the appropriate value;
   in the event the continuous number of bytes having the appropriate value is greater than or equal to the threshold number of bytes, determining, from the last N data chunks, a credential address range corresponding to the continuous number of bytes; and
   determining whether data stored in the data chunk storage corresponding to the credential address range comprises a credential.

2. A method as in claim 1, wherein determining whether data comprises a credential comprises meet a credential entropy test, comprising:
   determining a sequence of potential credential symbols relating to the credential address range;
   determining whether an entropy of the sequence of potential credential symbols is equal to or greater than an entropy of regular text; and
   in the event that the entropy of the sequence of potential credential symbols is equal to or greater than the entropy of regular text, determining that the data comprises the credential.

3. A method as in claim 1, further comprising receiving data.

4. A method as in claim 3, wherein the data chunk is determined using the received data.

5. A method as in claim 1, further comprising providing data in response to a data address range.

6. A method as in claim 1, wherein the threshold number of bytes comprises a minimum credential length.

7. A method as in claim 1, wherein determining whether data comprises a credential comprises matching a credential pattern.

8. A method as in claim 1, wherein determining whether data comprises a credential comprises matching a credential prefix.

9. A method as in claim 1, wherein determining whether data comprises a credential comprises meet a credential entropy test.

10. A method as in claim 1, wherein the range of ASCII values comprises credential values.

11. A method as in claim 1, wherein the data chunk comprises an M-byte data chunk.

12. A method as in claim 11, wherein the M-byte data chunk comprises one of the following: a 4 byte chunk, 8 byte chunk, a 16 byte chunk, a 32 byte chunk, a 64 byte chunk, or a 128 byte chunk.

13. A method as in claim 1, wherein a bit is used to indicate a byte having the appropriate value.

14. A method as in claim 13, wherein the continuous number of bytes is represented using a continuous number of bits.

15. A method as in claim 14, wherein determining whether the continuous number of bytes having the appropriate value is greater than or equal to the threshold number of bytes comprises determining the continuous number of bits across the last N chunks.

16. A method as in claim 1, wherein N comprises one of the following: 1 chunk, 2 chunks, 3 chunks, 4 chunks, 5 chunks, 6 chunks, 7 chunks, 8 chunks, 9 chunks, 10 chunks, 11 chunks, 12 chunks, 13 chunks, 14 chunks, 15 chunks, or 16 chunks.

17. A method as in claim 1, wherein in the event that the data comprises a credential, one or more of the following are performed: the credential is deleted, the credential is replaced, a code is code associated with the credential is stored in a private portion of a repository, and an indication is provided to a user or administrator that the credential has been uploaded.

18. A system for detecting user credentials, comprising:
a processor; and
a memory coupled with the processor, wherein the memory is configured to provide the processor with instructions which when executed cause the processor to:
determine a data chunk;
store, in a data chunk storage, the data chunk;
check that each byte of the data chunk comprises an appropriate value, wherein the appropriate value comprises a value in a range of ASCII values;
determine whether a continuous number of bytes having the appropriate value is greater than or equal to a threshold number of bytes, comprising to:
analyze each byte from a last N data chunks, wherein N corresponds to a positive integer value; and
determine, from the last N data chunks, continuous bytes having the appropriate value;
in the event the continuous number of bytes having the appropriate value is greater than or equal to the threshold number of bytes, determine, from the last N data chunks, a credential address range corresponding to the continuous number of bytes; and
determine whether data stored in the data chunk storage corresponding to the credential address range comprises a credential.

19. A computer program product for detecting user credentials, the computer program product being embodied in a non-transitory computer readable storage medium and comprising computer instructions for:
determining, using a processor, a data chunk;
storing, in a data chunk storage, the data chunk;
checking that each byte of the data chunk comprises an appropriate value, wherein the appropriate value comprises a value in a range of ASCII values;
determining whether a continuous number of bytes having the appropriate value is greater than or equal to a threshold number of bytes, comprising:
analyzing each byte from a last N data chunks, wherein N corresponds to a positive integer value; and
determining, from the last N data chunks, continuous bytes having the appropriate value;
in the event the continuous number of bytes having the appropriate value is greater than or equal to the threshold number of bytes, determining, from the last N data chunks, a credential address range corresponding to the continuous number of bytes; and
determining whether data stored in the data chunk storage corresponding to the credential address range comprises a credential.

* * * * *